United States Patent [19]
Okuno

[11] 4,332,446
[45] Jun. 1, 1982

[54] VIEW FINDER FOR CAMERA

[75] Inventor: Youichi Okuno, Yokohama, Japan

[73] Assignee: Canon Kabushiki Kaisha, Tokyo, Japan

[21] Appl. No.: 162,490

[22] Filed: Jun. 24, 1980

[30] Foreign Application Priority Data

Jun. 29, 1979 [JP] Japan ................................ 54-82276

[51] Int. Cl.³ .................... G03B 13/08; G03B 17/20
[52] U.S. Cl. ................................ 354/155; 354/225
[58] Field of Search ............... 354/152, 155, 219, 224, 354/225, 200, 201, 289, 53, 199

[56] References Cited

U.S. PATENT DOCUMENTS

| | | | |
|---|---|---|---|
| 3,524,380 | 8/1970 | Yamada et al. | 354/224 |
| 3,800,655 | 4/1974 | Uchida | 354/225 |
| 3,911,457 | 10/1975 | Okuno | 354/225 |
| 3,962,710 | 6/1976 | Okuno et al. | 354/225 |

FOREIGN PATENT DOCUMENTS 741844 11/1943 Fed. Rep. of Germany ...... 354/155

Primary Examiner—Donald A. Griffin
Attorney, Agent, or Firm—Toren, McGeady and Stanger

[57] ABSTRACT

A view finder for a camera includes an eye piece and an optical system having an optical axis to direct light from a certain view field towards the eye piece. A reflecting device directs light from outside the view field through the optical system at a given angle relative to the optical axis, and a sub-prism is arranged relative to the optical system to direct the light from outside the view field toward the eye piece after the light passes through the optical system. The sub-prism has a light incident plane, a light reflecting plane and a light emitting plane all of which are arranged so that after the light from outside the view field passes through the optical system, it enters the sub-prism through the light incident plane. The light is thereafter reflected from the reflecting plane so that it leaves the sub-prism from the light emitting plane.

2 Claims, 4 Drawing Figures

VIEW FINDER FOR CAMERA

BACKGROUND OF THE INVENTION:

1. Field of the Invention:

The present invention relates to a camera view finder which is arranged so that photographing information provided on the lens barrel or elsewhere is directed into the view finder to be displayed in the view field of the finder.

2. Description of the Prior Art:

The conventional view finder is so designed that; light rays which are not parallel to the optical axis of the view finder optics are bent toward the eye piece by means of a subprism, and are displayed outside of the view field of the finder.

SUMMARY OF THE INVENTION

The present invention relates to an improvement of the conventional view finder, and is characterized by the shape of the subprism.

DESCRIPTION OF THE PREFERRED EMBODIMENTS

Figure 1:
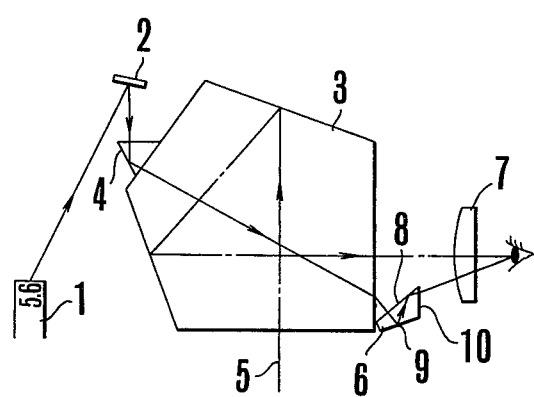
FIG. 1 shows schematically a first embodiment of the view finder of the present invention.

FIG. 1 shows a first embodiment of the present invention, including a lens barrel information body which may be, e.g., an aperture ring. The light coming from the lens barrel information body 1 is reflected from a small mirror 2, and then introduced into a pentagonal prism 3 by a small prism 4 provided on a non-reflecting front plane of the pentagonal prism. This information light, which crosses the optical axis of the view finder optics, then leaves the pentagonal prism 3. A subprism 6 is arranged between the pentagonal prism 3 and an eye piece 7, and has a light incident plane 8, a reflecting plane 9, and a light emitting plane 10. The subprism 6 is arranged so that information light incident upon the light incident plane 8 is reflected off of the light reflecting plane 9 toward the light incident plane 8. At the part of the incident plane 8 which receives the reflected light, a reflecting film (not shown) is formed, or the incident angle of the light is such that the light is totally reflected. Therefore, the information light, which has been reflected from the plane 8, is then emitted from the plane 10, and is directed toward the eye piece.

Figure 2:
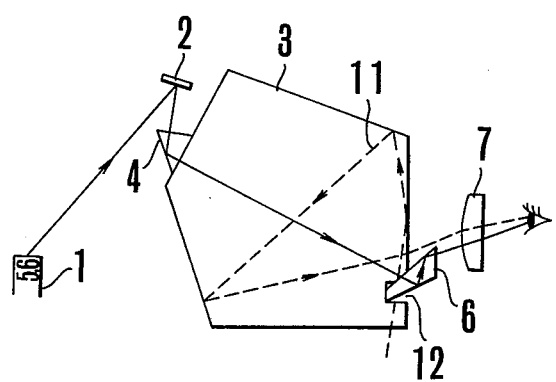
FIG. 2 shows a second embodiment of the present invention.
Figure 3:
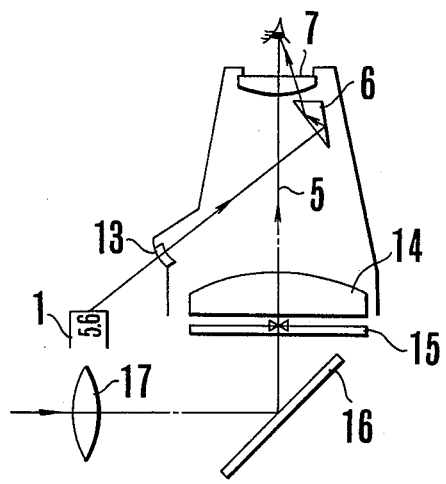
FIG. 3 shows a third embodiment in which the present invention is applied to a waist level view finder.

In case of the second embodiment shown in FIG. 2, the subprism 6 is inserted in a groove 12 in the prism 3 for cutting ghost light 11. Further, this subprism can be applied not only to the pentagonal prism system view finder, but also to a waist level view finder as shown in FIG. 3. Aperture or other information light passing through a lens 13 in a window provided on the outer wall of the view finder is directed toward the eye piece by the subprism 6. The view finder also includes a condenser lens 14, a focusing plate 15, a mirror 16 and an objective lens 17.

Figure 4:
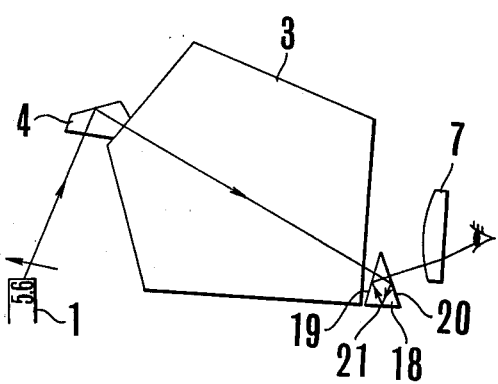
FIG. 4 shows a fourth embodiment of the present invention.

FIG. 4 shows a variation of the subprism 6. With subprism 18, the information light enters through a light incident plane 19, and is reflected off of a light emitting plane 20, a reflecting plane 21 and the light incident plane 19 and then leaves the prism 18 through the emitting plane 20.

What is claimed is:

1. A viewfinder for a camera, comprising an eye piece, an optical system having an optical axis for reflecting light from within a certain viewfield toward said eye piece, means for directing light from outside said certain viewfield through said optical system at a given angle relative to said optical axis, a sub prism arranged relative to said optical system and outside a path of the light from within a certain viewfield toward said eye piece for directing the light from outside said certain viewfield which passes through said optical system at said given angle toward said eye piece, said sub prism having a light incident plane, a light reflecting plane and a light emitting plane arranged so that the light from outside the viewfield which passes through said optical system enters said sub prism through said light incident plane and is reflected from said light reflecting plane toward said light incident plane to be substantially totally reflected by said light incident plane toward said light emitting plane to leave said sub prism.

2. A viewfinder for a camera, comprising an eye piece, an optical system having an optical axis for directing light from within a certain viewfield toward said eye piece, means for directing light from outside said certain viewfield through said optical system at a given angle relative to said optical axis, a sub prism arranged relative to said optical system and outside a path of the light from within a certain viewfield toward said eye piece for directing the light from outside said certain viewfield which passes through said optical system at said given angle toward said eye piece, said sub prism having a light incident plane, a light reflecting plane and a light emitting plane arranged so that the light from outside the viewfield which passes through said optical system enters said sub prism through said light incident plane and is reflected from said light emitting plane toward said light reflecting plane to be reflected toward said light incident plane and reflected by said light incident plane toward said light emitting plane to leave said sub prism.

* * * * *